(12) United States Patent
Chang et al.

(10) Patent No.: US 9,158,943 B2
(45) Date of Patent: Oct. 13, 2015

(54) ENCRYPTION AND DECRYPTION DEVICE FOR PORTABLE STORAGE DEVICE AND ENCRYPTION AND DECRYPTION METHOD THEREOF

(71) Applicant: ASMedia Technology Inc., New Taipei (TW)

(72) Inventors: Kuo-Chi Chang, New Taipei (TW); Hsin-Hsiung Wang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 13 days.

(21) Appl. No.: 14/154,194

(22) Filed: Jan. 14, 2014

(65) Prior Publication Data

US 2014/0208125 A1    Jul. 24, 2014

(30) Foreign Application Priority Data

Jan. 22, 2013   (TW) .............................. 102102335 A

(51) Int. Cl.
*G06F 21/78* (2013.01)
*G06F 21/85* (2013.01)

(52) U.S. Cl.
CPC ............... *G06F 21/85* (2013.01); *G06F 21/78* (2013.01); *G06F 2221/2107* (2013.01)

(58) Field of Classification Search
CPC .. G06F 21/78; G06F 21/85; G06F 2221/2107
USPC ....................................................... 713/193
See application file for complete search history.

(56) References Cited

U.S. PATENT DOCUMENTS

| 6,185,681 | B1 * | 2/2001 | Zizzi ............................. 713/165 |
| 7,415,115 | B2 * | 8/2008 | Ma ................................. 380/286 |
| 2005/0193195 | A1 | 9/2005 | Wu et al. |
| 2011/0314304 | A1 | 12/2011 | Braams |

FOREIGN PATENT DOCUMENTS

| CN | 201048046 Y | 4/2008 |
| CN | 201266495 Y | 7/2009 |
| TW | 200727656 | 7/2007 |
| TW | 201128440 A | 8/2011 |
| TW | 201202996 A | 1/2012 |

\* cited by examiner

*Primary Examiner* — Kambiz Zand
*Assistant Examiner* — Benjamin Kaplan
(74) *Attorney, Agent, or Firm* — CKC & Partners Co., Ltd.

(57) ABSTRACT

An encryption and decryption device for a portable storage device and an encryption and decryption method thereof are provided. The encryption and decryption device includes a storage element, a control element and an encryption and decryption circuit. The control element receives a password, saves the password to the storage element and provides an encryption and decryption command. The encryption and decryption circuit is electrically connected to a portable storage device, receives the encryption and decryption command, reads the password stored in the storage element according to the encryption and decryption command, and encrypts or decrypts data stored in the portable storage device by utilizing the password according to whether the data have been encrypted. After the data are encrypted or decrypted, the encryption and decryption circuit clears the password in the storage element.

14 Claims, 4 Drawing Sheets

ENCRYPTION AND DECRYPTION DEVICE FOR PORTABLE STORAGE DEVICE AND ENCRYPTION AND DECRYPTION METHOD THEREOF

CROSS-REFERENCE TO RELATED APPLICATION

This application claims the priority benefit of Taiwan application serial No. 102102335, filed on Jan. 22, 2013. The entirety of the above-mentioned patent application is hereby incorporated by reference herein and made a part of specification.

BACKGROUND OF THE INVENTION

1. Field of the Invention

The disclosure relates to an encryption and decryption (en/decryption) device, and more particularly, to an encryption and decryption device for a portable storage device and an encryption and decryption method thereof.

2. Description of the Related Art

As flash memory elements develop recently, a portable storage device, such as a universal serial bus (USB) flash drive, is widely used to store personal data.

Conventionally, the portable storage device does not include an encryption mechanism, when the portable storage device is lost or stolen, the confidential data may be accessed by other people and used for an improper purpose. In order to prevent the confidential data being revealed, some portable storage devices may include a built-in encryption mechanism. The user should input a preset password first, and then access the data in the portable storage device. However, if the password of the portable storage device is stolen or cracked, the confidential data can be read in any computer, which causes a security risk.

BRIEF SUMMARY OF THE INVENTION

An encryption and decryption device is provided. The encryption and decryption device includes a storage element, a control element and an encryption and decryption circuit.

The control element receives a password, stores the password in the storage element, and provides an encryption and decryption command. The encryption and decryption circuit is electrically connected to a portable storage device, receives the encryption and decryption command, reads the password stored in the storage element according to the encryption and decryption command, and encrypts or decrypts data stored in the portable storage device by utilizing the password according to whether the data are encrypted. After the data are encrypted or decrypted, the encryption and decryption circuit clears the password in the storage element.

An encryption and decryption method is also provided. The encryption and decryption method includes following steps: receiving a password; storing the password to the storage element; providing an encryption and decryption command to the encryption and decryption circuit; reading the password in the storage element by the encryption and decryption circuit according to the encryption and decryption command; encrypting or decrypting data stored in the portable storage device by the encryption and decryption circuit according to whether the data are encrypted or decrypted; and clearing the password in the storage element after the encryption and decryption circuit encrypts or decrypts the data.

In sum, the encryption and decryption device can encrypt or decrypt the data stored in the portable storage device via the encryption and decryption circuit. Thus, after the data stored in the portable storage device are encrypted, even though the password is obtained by other persons, they should decrypt the data via a specific device (such as a computer with the encryption and decryption circuit), which improves the security of the data stored in the portable storage device.

These and other features, aspects and advantages of the present disclosure will become better understood with regard to the following description, appended claims, and accompanying drawings.

DETAILED DESCRIPTION OF THE EMBODIMENTS

An encryption and decryption device for a portable storage device and an encryption and decryption method thereof are illustrated with relating figures.

The encryption and decryption device may be a computer, and the portable storage device may be a USB flash drive hereinafter, which is not limited herein.

Figure 1:
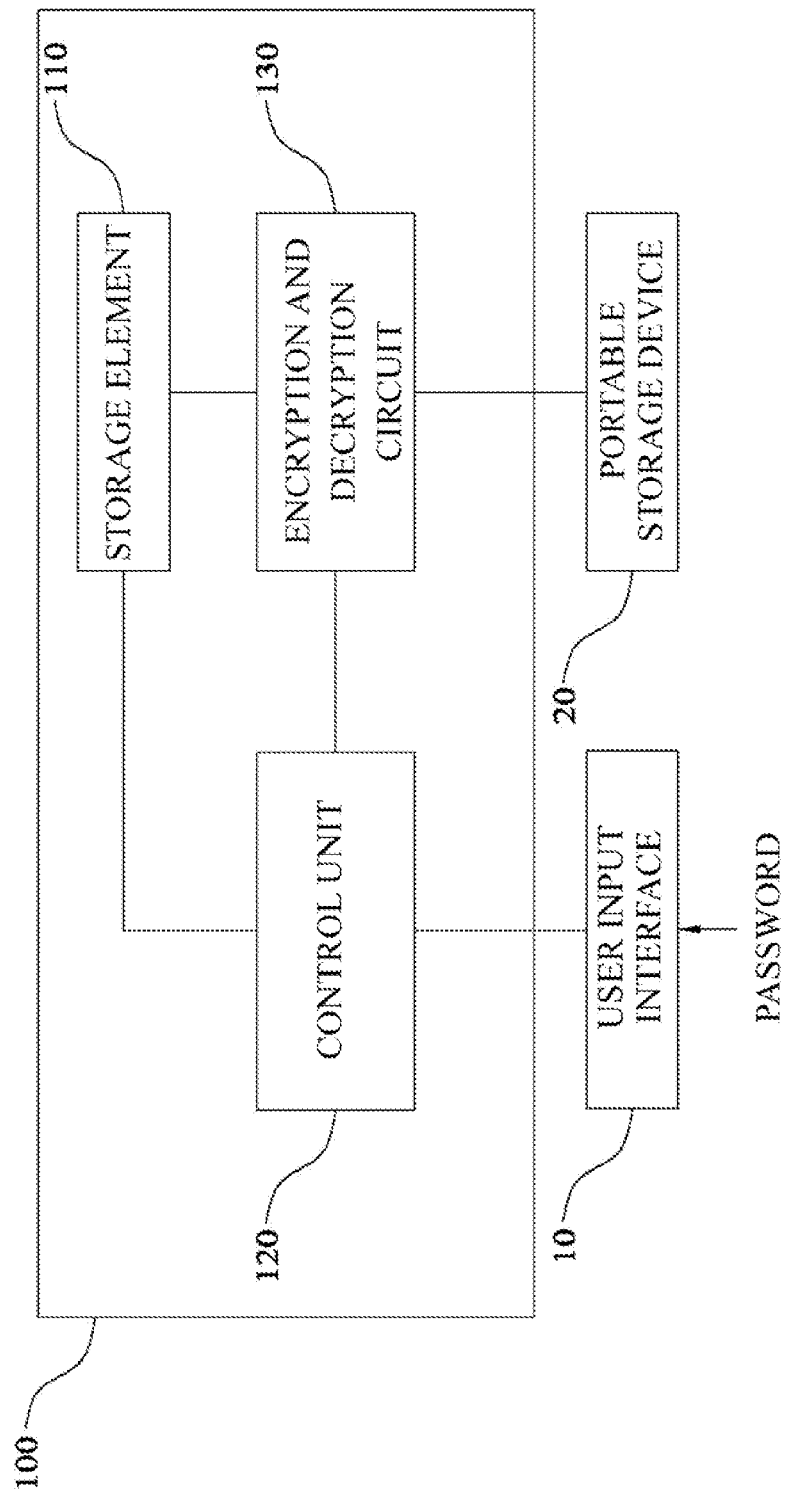
FIG. 1 is a schematic diagram showing an encryption and decryption device in a first embodiment.

FIG. 1 is a schematic diagram showing an encryption and decryption device 100 in a first embodiment. The encryption and decryption device 100 includes a storage element 110, a control element 120 and an encryption and decryption circuit 130. The control element 120 is connected to a user input interface 10, and the encryption and decryption circuit 130 is selectively connected to the portable storage device 20.

In the embodiment, the storage element 110 may be an electrically-erasable programmable read-only memory (EEPROM) or other storage elements to store data. The control element 120 may be a central processing unit (CPU), a microprocessor or other data process elements to process the data. The encryption and decryption circuit 130 may be an encryption and decryption chip or an encryption and decryption circuit combination which includes a calculating processor, a temporary register and a calculating circuit to execute an encryption and decryption algorithm. The user input interface 10 may be a keyboard, a mouse, a touch control panel or other input elements to input the data to the encryption and decryption device 100, which is not limited herein.

Figure 2:
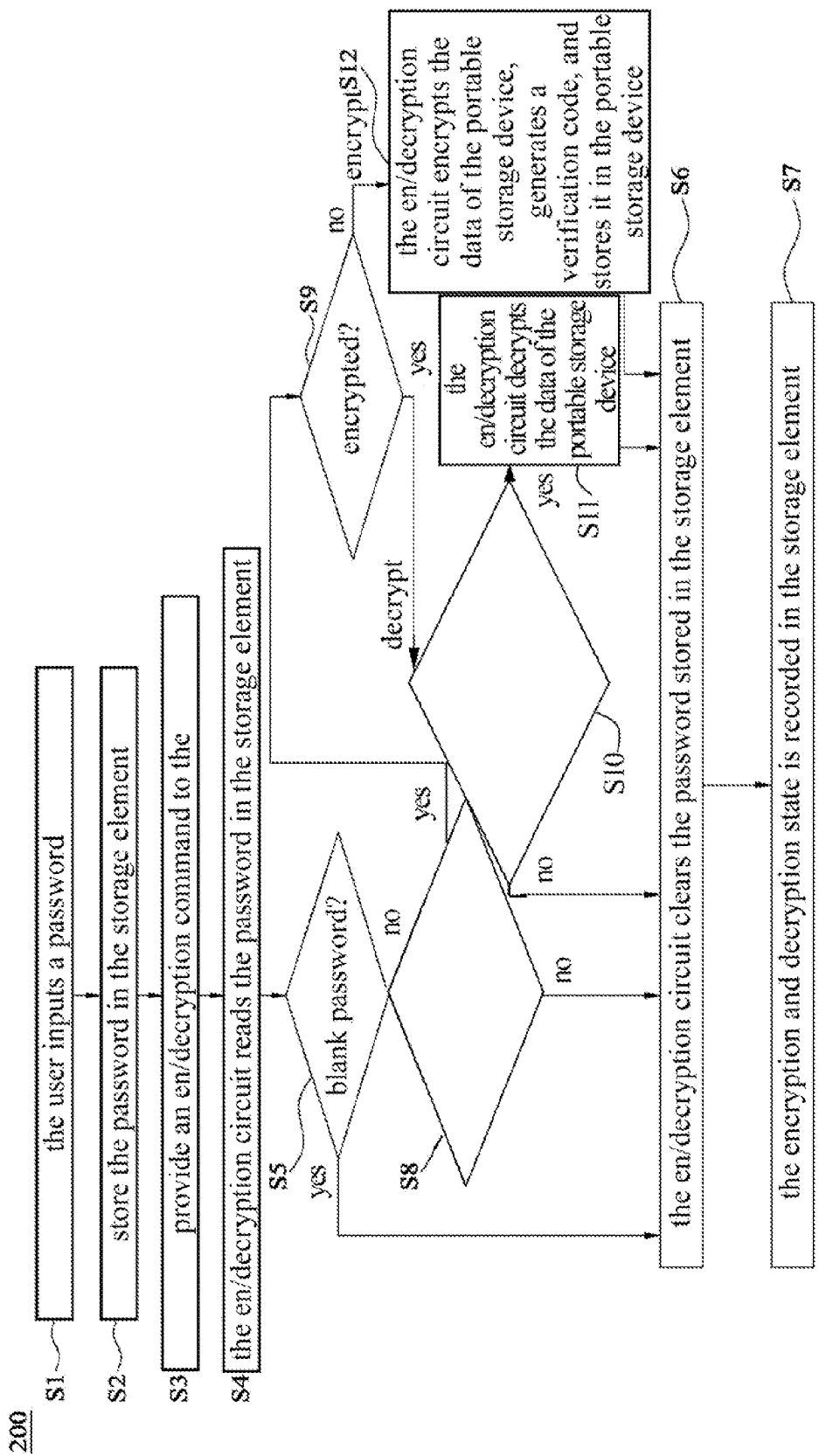
FIG. 2 is a flow chart showing an encryption and decryption method in a second embodiment.

FIG. 2 is a flow chart showing an encryption and decryption method 200 in a second embodiment. The encryption and decryption method 200 is applied to the encryption and decryption device 100 in FIG. 1, which is not limited herein.

First, the control element 120 can execute an encryption and decryption application program. When the encryption and decryption application program is executed, the user inputs a password via the user input interface 10 (step S1). After the control element 120 receives the password and stores the password in the storage element 110 (step S2) and provides an encryption and decryption command to the encryption and decryption circuit 130 (step S3) to enable the encryption and decryption circuit 130.

After the encryption and decryption circuit 130 receives the encryption and decryption command, and then reads the password stored in the storage element 110 (step S4) to determine whether the password is blank (such as a password of all zeroes or NULL) (step S5).

If the password is blank, the encryption and decryption circuit 130 clears the password in the storage element 110 (even though the password is blank) (step S6). Then, the encryption and decryption state (for example, the password is blank) is recorded in the storage element 110 (step S7), and the control element 120 can get the encryption and decryption state in subsequent steps. If the password is not blank, the encryption and decryption circuit 130 detects and determines whether the portable storage device 20 is connected to the encryption and decryption circuit 130 (step S8).

If the portable storage device 20 is not connected to the encryption and decryption circuit 130, the encryption and decryption circuit 130 also clears the password stored in the storage element 110 (step S6). Then, the encryption and decryption state (for example, the portable storage device 20 is not connected) is recorded in the storage element 110 (step S7). If the portable storage device 20 is connected to the encryption and decryption circuit 130, the encryption and decryption circuit 130 determines whether the data in the portable storage device 20 are encrypted (step S9), and the data are encrypted or decrypted by utilizing the password accordingly.

When the data in the portable storage device 20 are encrypted, the encryption and decryption circuit 130 decrypts a verification code of the portable storage device 20 and checks whether the password stored in the storage element 110 corresponds to the decrypted verification code (step S10). If the password corresponds to the decrypted verification code (for example, they are the same), the encryption and decryption circuit 130 decrypts the data of the portable storage device 20 (step S11), clears the password stored in the storage element 110 (step S6), and records the encryption and decryption state (for example, the decryption is successful) in the storage element 110 (step S7).

When the data of the portable storage device 20 are not decrypted, the encryption and decryption circuit 130 encrypts the data of the portable storage device 20, generates a group of the verification codes (such as an encrypted password) corresponding to the password stored in the storage element 110, and stores the verification codes in the portable storage device 20 (step S12).

When the data of the portable storage device 20 are encrypted, the encryption and decryption circuit 130 may generate an encryption tag and store it in the portable storage device 20, and when the data are decrypted, the encryption tag stored in the portable storage device 20 is cleared. Thus, the encryption and decryption circuit 130 can determine whether the data of the portable storage device 20 are encrypted according to the encryption tag. The encryption and decryption circuit 130 may determines whether the data of the portable storage device 20 are encrypted in other ways (such as whether the portable storage device 20 includes the verification code), which is not limited herein.

After the encryption and decryption circuit 130 encrypts or decrypts the data stored in the portable storage device 20, the encryption and decryption circuit 130 clears the password stored in the storage element 110 (step S6) to avoid the password revealed. Then, the encryption and decryption circuit 130 records the encryption and decryption state (such as a blank password) of successfully encrypting or decrypting in the storage element 110 (step S7). After the encryption and decryption state is recorded, the encryption and decryption circuit 130 notifies the control element 120 that the encryption or decryption is accomplished. After the control element 120 is notified, the encryption and decryption state stored in the storage element 110 can be read, and the encryption and decryption state can be displayed by the encryption and decryption application program.

The encryption and decryption device 100 can encrypt or decrypt the data stored in the portable storage device 20 via the encryption and decryption circuit 130. Thus, after the data stored in the portable storage device 20 are encrypted, even though the password is obtained by other persons, they still must decrypt the data via a specific device (such as a computer with the encryption and decryption circuit 130), which improves the security of the data stored in the portable storage device 20.

Furthermore, in the embodiment, the encryption and decryption circuit 130 may achieve an encryption and decryption algorithm (such as hash algorithm) via multiple logic elements. The encryption and decryption circuit 130 can encrypt or decrypt the data stored in the portable storage device 20 according to the encryption and decryption algorithm. In another embodiment, the encryption and decryption circuit 130 can also encrypt the password stored in the storage element 110 according to the encryption and decryption algorithm to generate the verification code, and can decrypt the verification code of the portable storage device 20 according to the encryption and decryption algorithm to check whether the password stored in the storage element 110 is correct. However, the encryption and decryption circuit 130 may encrypt and decrypt in other ways, which is not limited herein.

Figure 3:
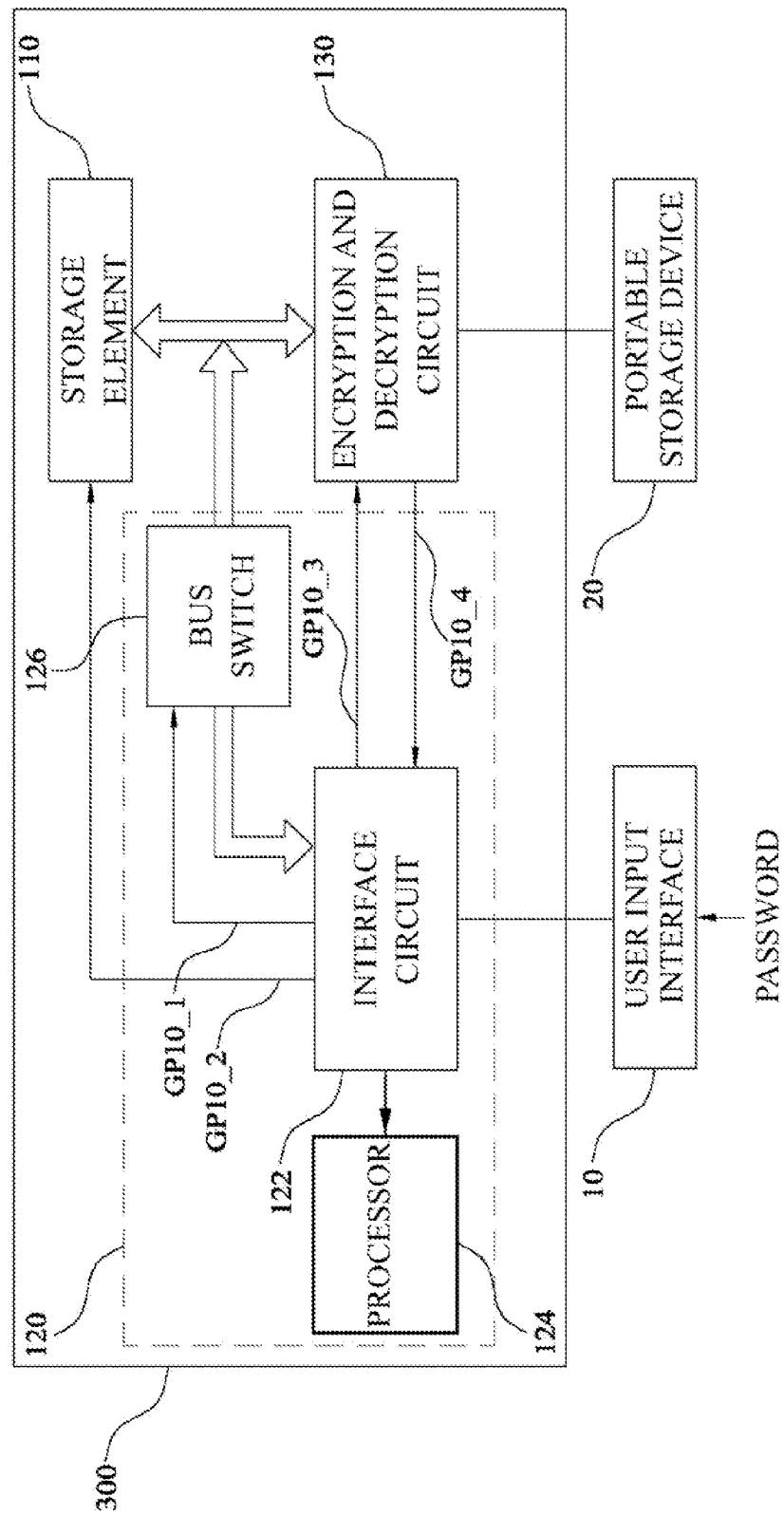
FIG. 3 is a schematic diagram showing an encryption and decryption device in a third embodiment.

FIG. 3 is a schematic diagram showing an encryption and decryption device 300 in a third embodiment. The encryption and decryption device 300 includes the storage element 110, the control element 120 and the encryption and decryption circuit 130. The configuration and operation of the components are similar with that in the first and the second embodiments, which is omitted herein.

In the embodiment, the control element 120 may include an interface circuit 122, a processor 124 and a bus switch 126. The interface circuit 122 may be a south bridge chip or other circuits to receive and send signals. The processor 124 may be a CPU or a micro-processor. The storage element 110 may be connected to the encryption and decryption circuit 130 via an inter-integrated circuit (I2C) bus. The interface circuit 122 may be selectively connected to the storage element 110 via the bus switch 126 and the I2C bus.

Figure 4:
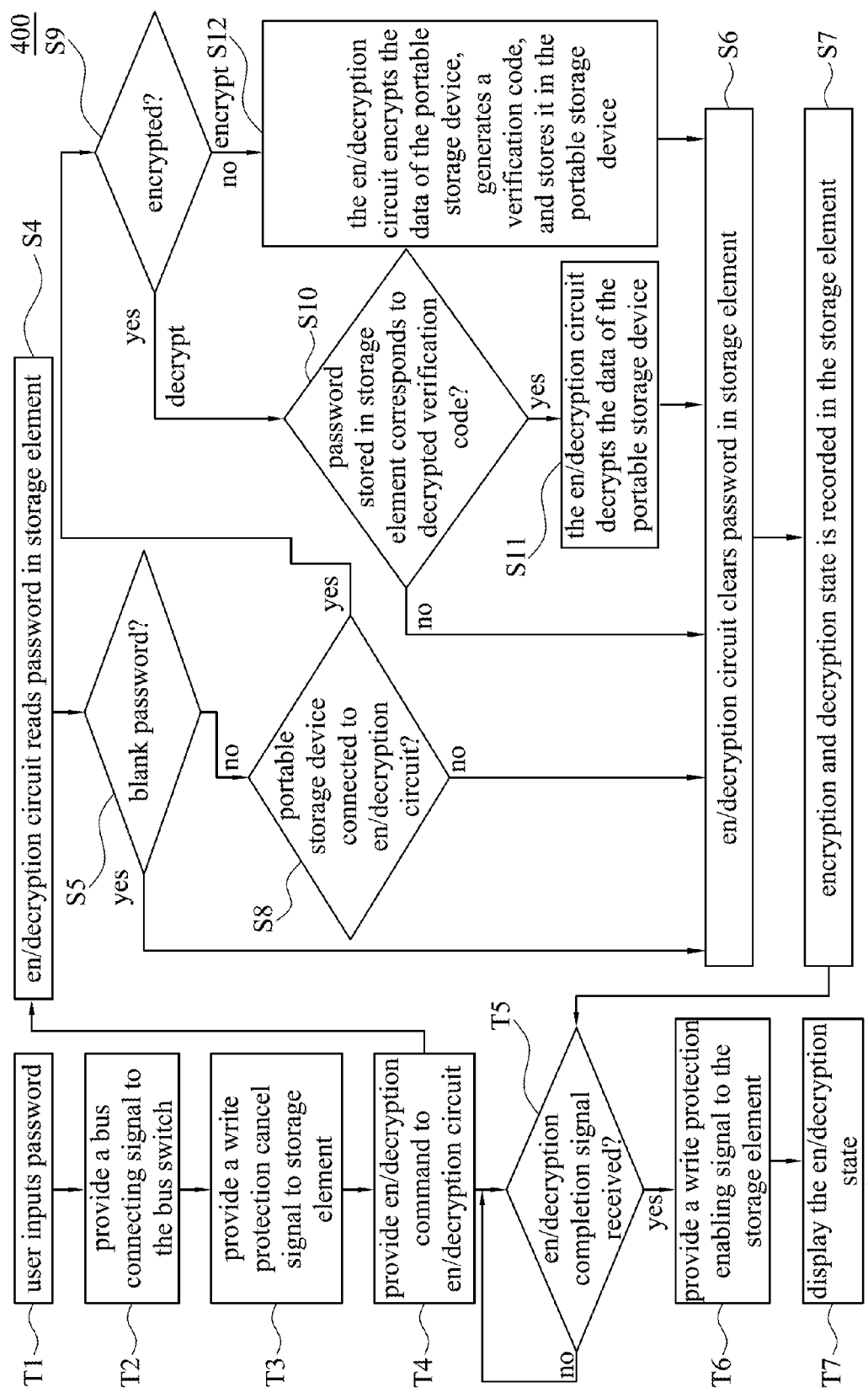
FIG. 4 is a flow chart showing an encryption and decryption method in a fourth embodiment.

FIG. 4 is a flow chart showing an encryption and decryption method 400 in a fourth embodiment. The encryption and decryption method 400 can be applied to the encryption and decryption device 300 in FIG. 3, which is not limited herein.

The processor 124 can execute the encryption and decryption application program and receive the password via the user input interface 10 and the interface circuit 122 (step T1). Then, the processor 124 provides a bus connecting signal to the bus switch 126 via a general purpose I/O pin GPIO_1 of the interface circuit 122 (for example, the potential of the pin GPIO_1 is pulled high) (step T2) to connect the interface circuit 122 to the storage element 110 via the bus switch 126. The processor 124 can provide a write protection cancel signal to the storage element 110 via a pin GPIO_2 of the interface circuit 122 (for example, the potential of the pin GPIO_2 is pulled high) (step T3) to write the data to the storage element 110, which is not limited herein.

Then, the processor 124 stores the password in the storage element 110 via the interface circuit 122 and the I2C bus, and it provides the encryption and decryption command to the encryption and decryption circuit 130 via a pin GPIO_3 of the interface circuit 122 (for example, the potential of the pin GPIO_3 is pulled high) (step T4) to enable the encryption and decryption circuit 130. The processor 124 detects a pin GPIO_4 of the interface circuit 122 to determine whether the encryption or decryption completion signal sent by the encryption and decryption circuit 130 is received (step T5), which is not limited herein.

The steps of encrypting and decrypting the data of the portable storage device 20 by the encryption and decryption circuit 130 are the same as the steps S4 to S12 in the second embodiment, which is omitted herein.

After the encryption or decryption is finished and the encryption and decryption circuit 130 clears the password stored in the storage element 110, the encryption and decryption circuit 130 provides an encryption or decryption completion signal to the interface circuit 122 via the pin GPIO_4 (for example, the potential of the pin GPIO_4 is pulled high). When the processor 124 receives the encryption or decryption completion signal via the interface circuit 122, the processor 124 provides a write protection enabling signal to the storage element 110 via the pin GPIO_2 of the interface circuit 122 (for example, the potential of the pin GPIO_2 is pulled low) (step T6) to prevent the data being written to the storage element 110. Furthermore, the processor 124 can read the encryption and decryption state stored in the storage element 110, and the encryption and decryption state can be displayed via the encryption and decryption application program (step T7).

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An encryption and decryption device for a portable storage device, comprising:
   a storage element;
   a control element receiving a password, storing the password in the storage element, and providing an encryption and decryption command; and
   an encryption and decryption circuit electrically connected to the portable storage device, receiving the encryption and decryption command, reading the password stored in the storage element according to the encryption and decryption command, and encrypting or decrypting data stored in the portable storage device by utilizing the password according to whether the data are encrypted, wherein after the data are encrypted or decrypted, the encryption and decryption circuit clears the password in the storage element, and wherein when the data are encrypted, the encryption and decryption circuit decrypts a verification code of the portable storage device, and checks whether the password matches the decrypted verification code to determine whether to decrypt the data.

2. The encryption and decryption device for the portable storage device according to claim 1, wherein when the data are not encrypted, the encryption and decryption device generates the verification code corresponding to the password and stores the verification code to the portable storage device.

3. The encryption and decryption device for the portable storage device according to claim 1, wherein when the data are encrypted, the encryption and decryption circuit generates an encryption tag and stores the encryption tag in the portable storage device, and the encryption and decryption circuit determines whether the data are encrypted according to the encryption tag.

4. The encryption and decryption device for the portable storage device according to claim 1, wherein the encryption and decryption circuit stores an encryption and decryption state to the storage element, and the control element gets the encryption and decryption state by reading the storage element.

5. The encryption and decryption device for the portable storage device according to claim 4, wherein before the password is stored in the storage element, the control element further provides a writing protection cancel signal to the storage element, and after the encryption and decryption circuit stores the encryption and decryption state to the storage element, the encryption and decryption circuit provides an encryption or decryption completion signal to the control element, and the control element provides a writing protection enabling signal to the storage element according to the encryption or decryption completion signal.

6. The encryption and decryption device for the portable storage device according to claim 1, wherein the encryption and decryption circuit encrypts or decrypts the data according to an encryption and decryption algorithm.

7. The encryption and decryption device for the portable storage device according to claim 1, wherein the control element further includes:
   an interface circuit selectively connected to the storage element; and
   a processor receiving the password, storing the password to the storage element via the interface circuit, and providing the encryption and decryption command via the interface circuit.

8. The encryption and decryption device for the portable storage device according to claim 7, wherein the encryption and decryption device further includes a bus switch to selectively connect the interface circuit to the storage element, and before the password is stored in the storage element, the control element provides a bus connecting signal to the bus switch via the interface circuit to electrically connect the interface circuit to the storage element.

9. An encryption and decryption method of the portable storage device applied to an encryption and decryption device, wherein the encryption and decryption device includes a storage element, a control element and an encryption and decryption circuit, the encryption and decryption method comprising:
   receiving a password;
   storing the password to the storage element;
   providing an encryption and decryption command to the encryption and decryption circuit;
   reading the password in the storage element by the encryption and decryption circuit according to the encryption and decryption command;
   encrypting or decrypting data stored in the portable storage device by the encryption and decryption circuit according to whether the data are encrypted or decrypted; and
   clearing the password in the storage element after the encryption and decryption circuit encrypts or decrypts the data;
   wherein the step of encrypting or decrypting the data stored in the portable storage device according to whether the data are encrypted or decrypted further includes:
   decrypting a verification code stored in the portable storage device by the encryption and decryption circuit if the data are encrypted;

checking whether the password corresponds to the decrypted verification code by the encryption and decryption circuit; and decrypting the data by the encryption and decryption circuit when the password corresponds to the decrypted verification code.

10. The encryption and decryption method of the portable storage device according to claim 9, wherein the step of encrypting or decrypting the data stored in the portable storage device according to whether the data are encrypted or decrypted further includes:

encrypting the data by the encryption and decryption circuit, generating a verification code corresponding to the password, and storing the verification code to the portable storage device if the data are not encrypted.

11. The encryption and decryption method of the portable storage device according to claim 9, wherein the encryption and decryption method further includes:

generating an encryption tag and storing the encryption tag to the portable storage device by the encryption and decryption circuit when the data are encrypted; and determining whether the data are encrypted according to the encryption tag.

12. The encryption and decryption method of the portable storage device according to claim 9, wherein the encryption and decryption method further includes:

storing an encryption and decryption state in the storage element by the encryption and decryption circuit; and reading the storage element to get the encryption and decryption state.

13. The encryption and decryption method of the portable storage device according to claim 9, wherein the encryption and decryption method further includes:

providing a writing protection cancel signal to the storage element before the password is stored in the storage element;

providing an encryption or decryption completion signal by the encryption and decryption circuit after the encryption and decryption state is stored in the storage element; and providing a writing protection enabling signal to the storage element according to the encryption or decryption completion signal.

14. The encryption and decryption method of the portable storage device according to claim 9, wherein the step of encrypting or decrypting the data stored in the portable storage device according to whether the data are encrypted or decrypted further includes:

encrypting or decrypting the data by the encryption and decryption circuit according to an encryption and decryption algorithm.

* * * * *